United States Patent [19] [11] 4,065,801
Leaming [45] Dec. 27, 1977

[54] KIT FOR CLEANING TAPE CARTRIDGE PLAYBACK UNIT

[76] Inventor: Raymond C. Leaming, 721 S. Washington, Liberal, Kans. 67901

[21] Appl. No.: 609,009

[22] Filed: Aug. 29, 1975

[51] Int. Cl.$^2$ .................................................. G11B 5/41
[52] U.S. Cl. ......................................... 360/137; 15/246; 360/128
[58] Field of Search .............. 360/137, 132, 128, 93; 15/246, 257, 100, 145, 159 R, 23

[56] References Cited

U.S. PATENT DOCUMENTS

| B 449,892 | 3/1976 | Thompson | 360/132 |
| 3,407,431 | 10/1968 | Melnik | 15/23 |
| 3,761,994 | 10/1973 | Becht | 360/128 |
| 3,881,195 | 4/1975 | Ono | 360/128 |
| 3,955,214 | 5/1976 | Post et al. | 360/137 |

OTHER PUBLICATIONS

Admiral Tape Player 8Y6 Chassis Service Manual, (5-74), see p. 5.

Primary Examiner—Jay P. Lucas
Attorney, Agent, or Firm—Berman, Aisenberg & Platt

[57] ABSTRACT

A kit for cleaning the interior working parts of a cartridge type tape playback unit comprises a completely hollow cartridge case having parallel track guide means disposed in its two sides. The hollow cartridge case is designed to actuate the unit when it is inserted in the unit and provide the user of the cleaning kit with an unobstructed view of the playback head, the capstan and the sensing pole as well as other similarly disposed interior working parts over which the tape would normally travel. A tool holder having three interchangeable heads is provided. Two of the heads, one of abrasive material and the other of felt or the like, are formed with a concave cleaning surface and are dimensioned so as to be received between the guides in the side walls of the cartridge case. The guides are aligned with the capstan so as to direct the concave surface of the cleaning head into intimate contact with the capstan surface. The third cleaning head is formed as a swab of cotton-like material and is designed for cleaning the sensing pole and playback head.

10 Claims, 10 Drawing Figures

U.S. Patent  Dec. 27, 1977  Sheet 2 of 2  4,065,801
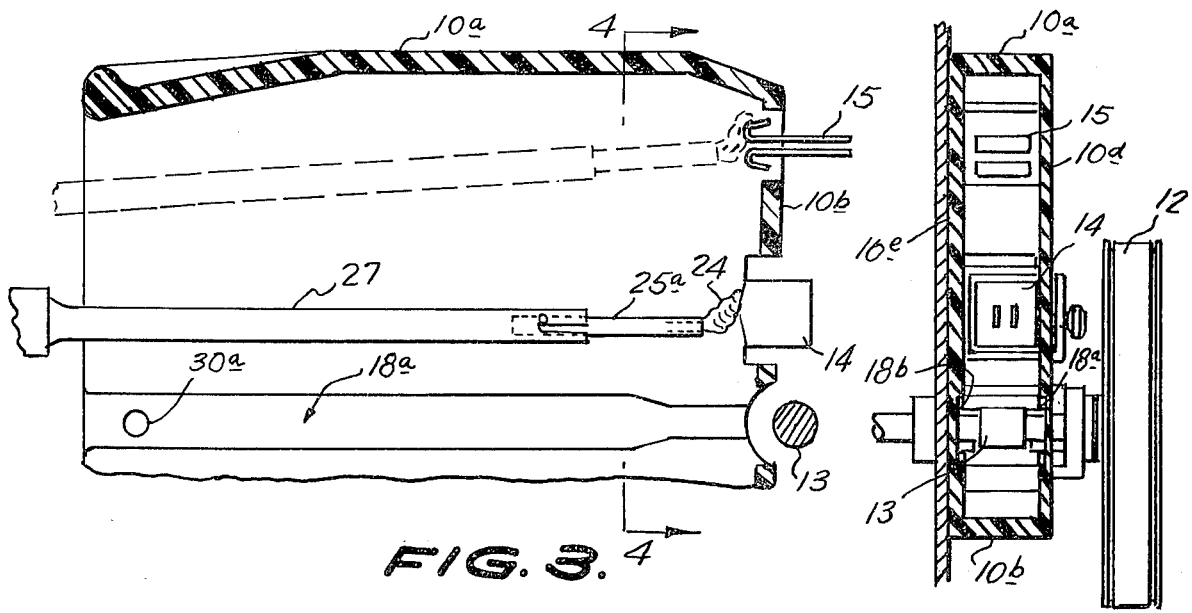
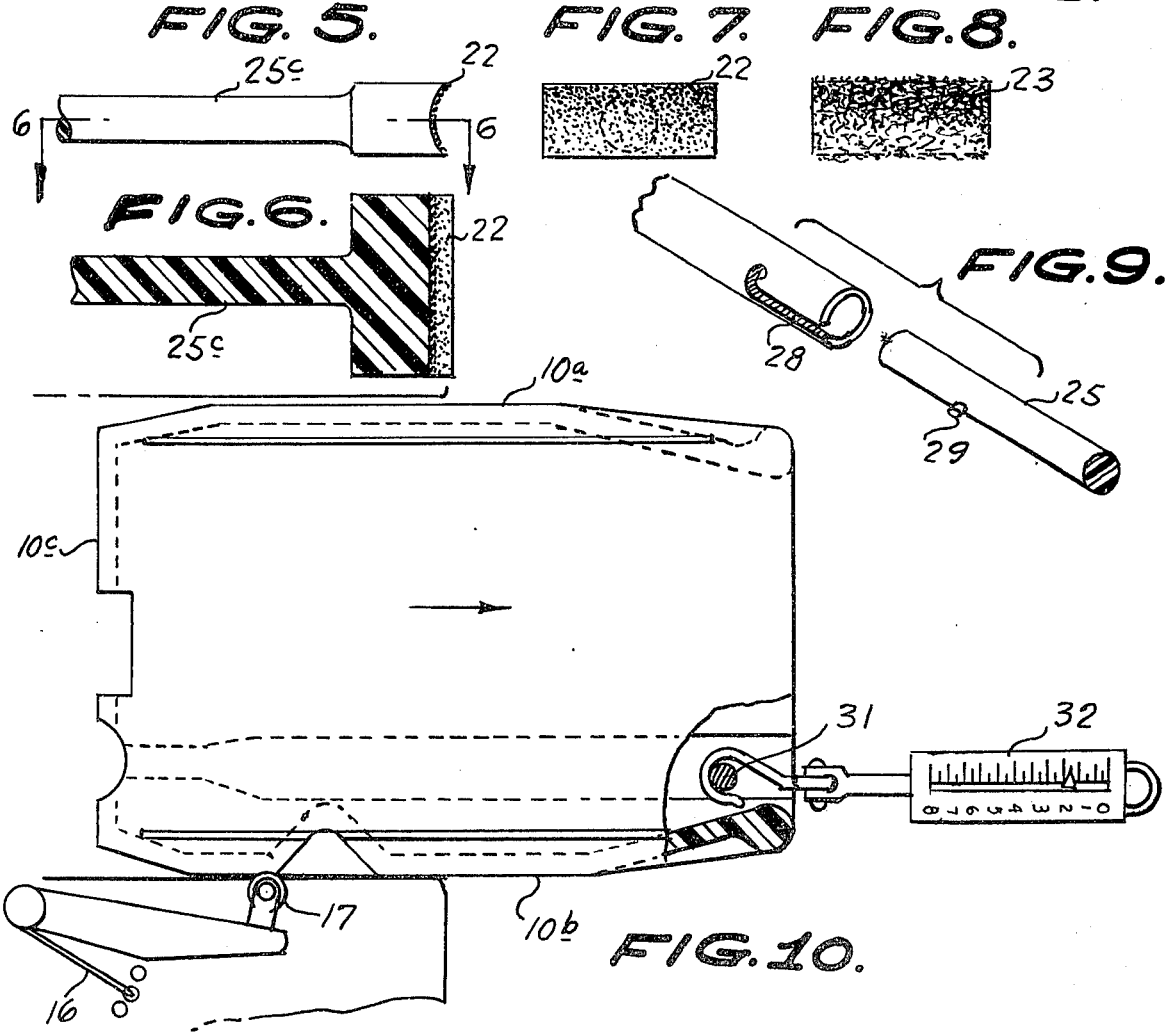

KIT FOR CLEANING TAPE CARTRIDGE PLAYBACK UNIT

BACKGROUND OF THE INVENTION

1. Field of the Invention

The present invention relates to the cleaning of components of a tape player of the cartridge type and more particularly relates to a kit, including a hollow cartridge insertable in a tape player, for effecting the cleaning of the player components.

2. Description of the Prior Art

Recently, the use of cartridge-type pre-recorded tapes, and particularly those of the 8-track variety, has become extremely widespread. Along with the convenience and pleasure which these cartridges provide, have come problems which are peculiar to the construction of the playback units.

The playback units of the cartridge-type include playback heads and related structures which are normally mounted in an enclosed location, since the cartridges are positioned for playing by being inserted in a slot-like aperture. It has been found that the playback head, the drive capstan, the sensing pole utilized for switching tracks in an 8-track tape and other related components of the playback unit, which contact the moving tape or which are immediately adjacent to the moving tape, tend to accumulate deposits of Mylar or other tape coating oxides after the devices have been in use over an extended period of time. Such accumulations on the playback head give rise to noise and distortion as the tape is played back. Further, the deposits on the drive capstan often result in slippage of the tape, causing wow and flutter as the tape is being played back, since the playback speed will not be constant.

In the past, cleaning of the tape playback head, the drive capstan and the sensing pole as well as the other related components of the playback unit, required the laborious disassembly of the entire unit in order to gain access to these various parts. Such a procedure was obviously unsatisfactory from the economic standpoint, since it required the services of a skilled maintenance person and was extremely time-consuming. More recently, various other solutions to this problem have been proposed. One of the more common commercially available cleaning devices involves a cartridge having a cleaning tape coated with an abrasive material, substituted for the ordinary magnetic tape. This type of device has proven to be unsatisfactory in many respects among which are the undue wear which it causes on the playback head, the limited area of the drive capstan which it is able to clean, the wear on the drive capstan, and the build-up of foreign material which it causes on either side of the cleaning tape. Other devices of various sorts have also been proposed, but none of these has been entirely successful.

The following patents set forth some of the approaches taken in the prior art to solve the above-noted problem:

| | | |
|---|---|---|
| 3,439,922 | Howard | 1969 |
| 3,594,850 | Wellington | 1971 |
| 3,647,990 | Eul | 1972 |
| 3,701,178 | Kuntz | 1972 |

SUMMARY OF THE INVENTION

In accordance with the present invention, there is provided a kit for cleaning the interior working parts of a cargridge-type tape playback unit which includes a hollow cartridge designed to be inserted in the normal tape cartridge receiving slot of the playback unit and to actuate the machine. Also included in the kit are a tool holder having three interchangeable heads, two of the heads being of a conformation so as to specifically adapt them for cleaning the drive capstan while the other head is of a more generalized type, preferably taking the form of a cotton swab and being useful for cleaning the playback head and the sensing pole. Disposed on the inner side walls of the hollow cartridge are parallel trackways in alignment with the capstan. These trackways serve as a guide for the insertion of the capstan cleaning heads so that the user of the kit does not have to visually align the tool with the capstan. The front portion of the cartridge is completely open while the back portion of the cartridge contains cut-out portions surrounding respectively the capstan, the playback head and the sensing pole, to permit ready access to these components when the cartridge is inserted in place. In addition to providing access to the components for cleaning purposes, the completely hollow cartridge of the present invention permits the user of the kit to visually observe any signs of wear on the head and the drive capstan. Additionally, the drive capstan may be observed throughout its entire circumferential extent as it rotates, thus permitting the user of the kit to thoroughly clean this component, which would not be the case if the capstan were only observed at rest in a single position with a portion of its surface hidden from view.

Thus, it is a principal object of the present invention to provide a kit for cleaning tape player components.

It is a further object of the present invention to provide a hollow cartridge for insertion in the tape player to create an unobstructed view of the working components of the player.

A still further object of the present invention is to provide a kit for cleaning tape player components which includes a tool holder having a series of interchangeable heads, each adapted to perform a separate and distinct cleaning function.

Yet another object of the present invention is to provide a hollow cartridge insertable in a tape player and having guide means aligned with the drive capstan to permit accurate positioning of a cleaning tool to clean the capstan.

BRIEF DESCRIPTION OF THE DRAWINGS

FIG. 3 is a sectional view similar to FIG. 2 but indicating the manner in which the cleaning tool is positioned to clean the other components of the playback unit.

FIG. 4 is a sectional view taken on the line 4—4 in FIG. 3 looking in the direction of the arrows.

FIG. 5 is a partial side elevation showing the cleaning tool positioned for cleaning the drive capstan.

FIG. 6 is a sectional view taken on line 6—6 in FIG. 5 looking in the direction of the arrows.

FIG. 7 is a plan view of one of the interchangeable heads for cleaning the drive capstan.

FIG. 8 is a plan view of another interchangeable head for cleaning the drive capstan.

FIG. 9 is a partial perspective view of the manner in which the interchangeable heads engage with the tool holder.

FIG. 10 illustrates an auxiliary feature of the present invention whereby the tension on the cartridge may be measured.

DESCRIPTION OF THE PREFERRED EMBODIMENT

Figure 1:
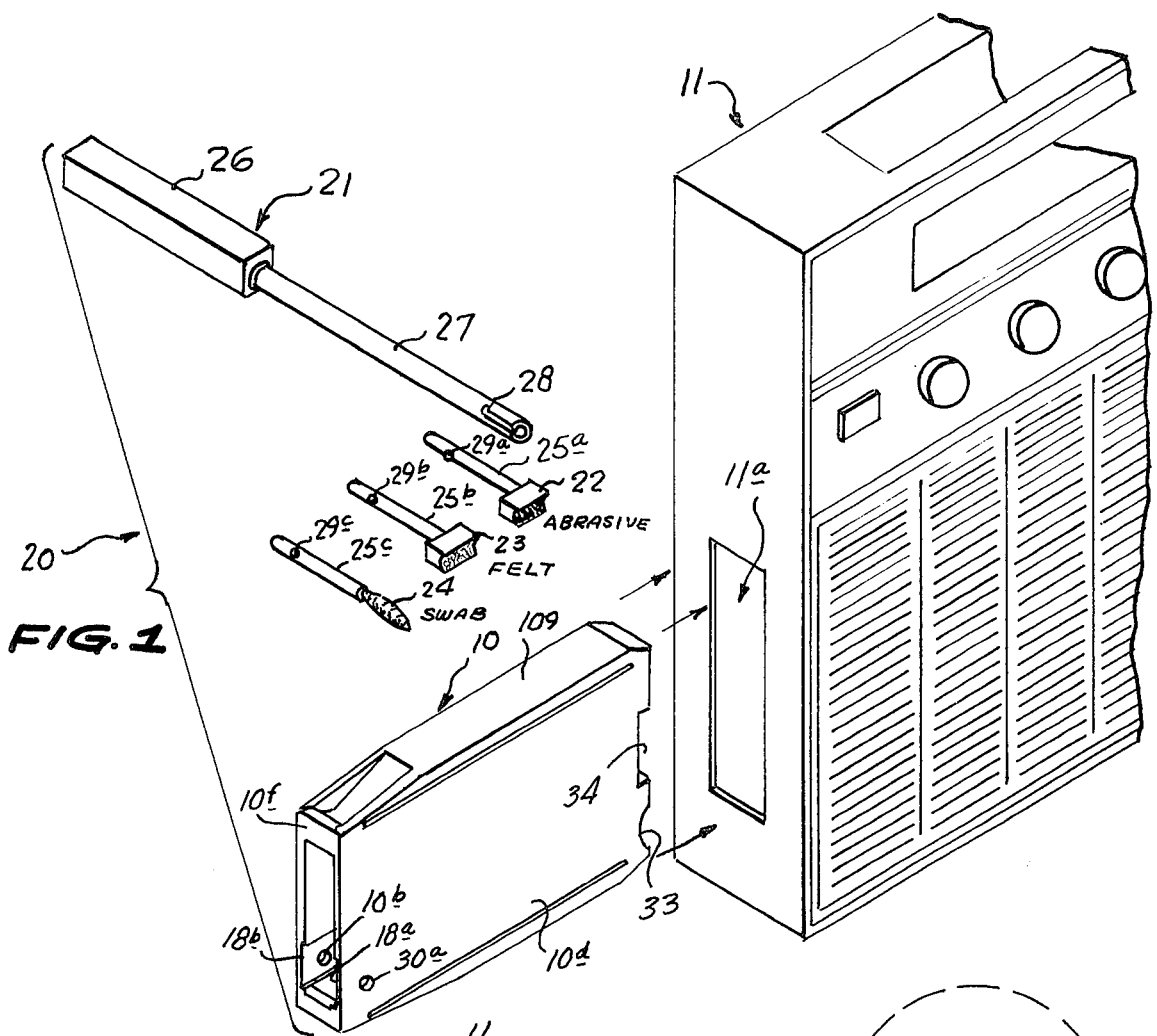
FIG. 1 is a perspective view of the various components of the kit of the present invention indicating the manner in which the hollow cartridge is inserted in a tape playback unit.

Referring now to the drawings and in particular to FIG. 1, there is shown a portion of a conventional 8-track playback unit 11 having an opening 11a therein for normally receiving an 8-track cartridge. The elements of the kit of the present invention for cleaning the components of the playback unit are generally designated by the reference numeral 20.

The elements of the kit include a hollow cartridge 10, formed of plastic or the like, and which may be conveniently made by removing the inner parts of a conventional 8-track cartridge tape. The hollow cartridge case 10 includes an upper wall 10a, a bottom wall 10b, a rear wall 10c, a front wall 10f and side walls 10d and 10e. Apertures 30a and 30b are provided in side walls 10d and 10e respectively for a purpose which will appear more fully hereinbelow. The conventional cartridge case is modified by providing parallel trackways 18a and 18b on the interior sides of side walls 10d and 10e, respectively for a purpose which will be explained more fully hereinbelow.

Provided with the kit of the present invention is tool holder 21 having a handle portion 26 and a shaft 27 with a bayonet slot 28 in its end for lockingly receiving interchangeable cleaning heads 22, 23 and 24. Cleaning head 22 has a concave abrasive surface for mating with a drive capstan, cleaning head 23 has a concave felt surface for cleaning the drive capstan while cleaning head 24 takes the form of a cotton swab or the like. Cleaning heads 22, 23 and 24 are respectively provided with shafts 25a, 25b and 25c having projections 29a, 29b and 29c thereon for lockingly engaging bayonet slot 28 of tool holder 21.

Turning to FIGS. 5, 6, 7, 8 and 9, the above described features of the tool holder and interchangeable cleaning heads may be more readily observed. As seen in FIG. 5, the concave abrasive surface 22, which is used for honing the capstan 13, mates closely with the surface of the capstan and may be conveniently formed by providing a plastic base with a thin strip of abrasive material such as 500 grit emery cloth. This construction may be seen in the cross-sectional view of FIG. 6. FIG. 7 illustrates the abrasive surface of cleaning head 22 while FIG. 8 illustrates the felt or similar material which may be applied to a plastic base or the like, comprising a cleaning head 23. As shown in FIG. 9 in general form, any one of the projections 29 is designed to mate with bayonet slot 28 by sliding movement there into and twisting the shaft 25, in a well known manner.

Figure 2:
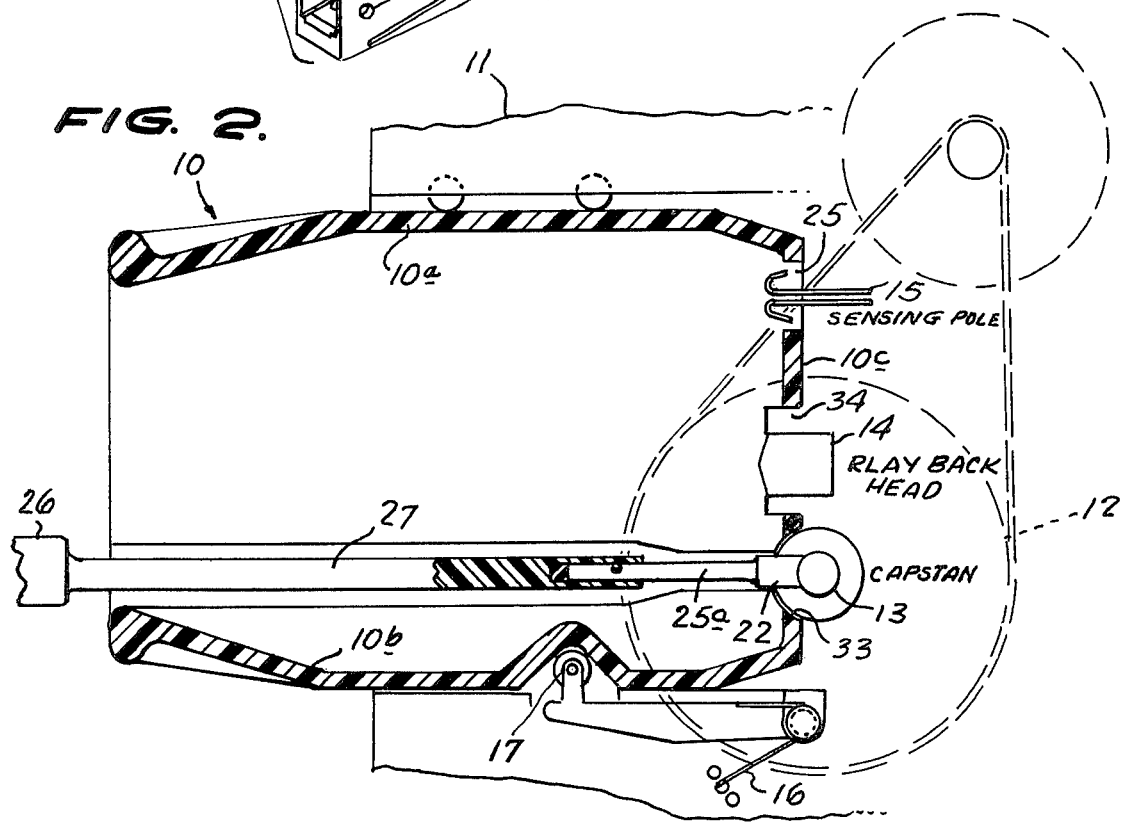
FIG. 2 is a sectional view showing the hollow cartridge of the present invention inserted in the playback unit with a cleaning tool positioned for cleaning the drive capstan.

Referring now to FIGS. 2, 3 and 4, the operation of the present invention will be described. Hollow tape cartridge 10 is inserted in slot 11a so that cut-out portion 33 in rear wall 10c of cartridge casing 10 surrounds capstan 13, cut-out portion 34 surrounds playback head 14 and cut-out portion 35 surrounds sensing pole 15. Lock spring 16 and pressure roller 17 retain the cartridge casing in place in a well known manner and the insertion of the cartridge case in slot 11a activates the unit by depression of a microswitch (not shown) in a conventional fashion. With the unit thus actuated, flywheel 12 will drive capstan 13 causing it to rotate. At this point, the user of the kit may observe the rotating capstan through the opening in the front wall 10f of hollow cartridge case 10 and may similarly observe sensing pole 15 and playback head 14. A decision will then be made as to whether these various parts need cleaning.

In order to clean the capstan, abrasive head 22 is locked to tool holder 21 in the manner described hereinabove and the tool is inserted through the opening in front wall 10f along parallel trackways 18a and 18b which are directly aligned with capstan 13, as shown in FIG. 2. Abrasive head 22 is so dimensioned that it will securely fit between trackways 18a and 18b and be unerringly guided into intimate contact with the surface of capstan 13.

After the honing operation has been performed for approximately 10 seconds, tool holder 21 is removed from trackways 18a and 18b, abrasive head 22 is replaced by felt head 23, which may be dipped in methyl alcohol or the like, and the above described operation is repeated, this time to remove all foreign matter from the surface of the capstan.

In order to clean the playback head 14 and the sensing pole 15, as illustrated in FIG. 3, tool holder 21 is fitted with swab head 24 which may be dipped in methyl alcohol or the like, the tool is inserted through the opening in the front wall 10f of hollow cartridge case 10 and the surfaces of these components may be cleaned.

Turning now to FIG. 10, an auxiliary feature of the present invention, which permits the person servicing the tape playback unit 11 to measure the tension on the cartridge, is illustrated. As is well known, the cartridge is retained in place by the pressure exerted through pressure roller 17 and lock spring 16. From time to time this pressure changes and must be adjusted so that the cartridge does not bear too heavily against playback head 14 and capstan 13. In order to measure the existing pressure on the cartridge, peg 31 is inserted in apertures 30a and 30b and the hollow cartridge case 10 is inserted in place, as above described. Spring scale 32 may then be hooked around peg 31 and the scale pulled in the direction of the arrow in FIG. 10. A reading may then be visually taken from spring scale 32 at the instant when pressure roller 17 disengages from hollow cartridge case 10 and the cartridge comes loose. This will provide an indication of the actual pressure exerted on a tape cartridge when it is inserted in the playback unit. If the pressure is too large or too great, it may be adjusted in a conventional manner by changing the position of lock spring 16 through an adjustment hole (not shown).

It will be understood that while the invention has been described hereinabove by way of an illustrative embodiment adapted to an 8-track cartridge, the invention is not so limited. Of course, the present invention may be adapted for use with any magnetic tape cartridge configuration, including cassettes and 4-track systems, currently available commercially.

While a particular embodiment of the present invention has been shown and described, it will be appreciated by those skilled in the art that changes and modifications may be made therein without departing from the true spirit and scope of the invention which is defined in the claims appended hereinbelow.

I claim:
1. A kit for cleaning the components of a cartridge tape playback unit having a rotating drive capstan and an opening for receiving a cartridge enclosed tape, comprising:
   a. a hollow cartridge case having side walls and a substantially completely open front end for providing unobstructed viewing of said components, to determine whether or not any of said components require cleaning, when said cartridge is inserted in said cartridge receiving opening;
   b. separate, non-affixed tool holder means for mounting at least one cleaning head for cleaning at least one of said components when said viewing determines that cleaning is required; and
   c. access means in the rear end of said cartridge for permitting said tool to pass through said cartridge from said open front end and selectively engage said at least one of said components.

2. The kit set forth in claim 1 further including a plurality of interchangeable cleaning heads selectively mountable on said tool holder.

3. The kit set forth in claim 1 wherein said access means in the rear of said cartridge case includes cut-out means for providing access to said capstan.

4. The kit set forth in claim 2 wherein at least one of said interchangeable cleaning heads includes a concave surface for engaging the surface of said capstan.

5. The kit set forth in claim 1 further including trackway means provided in the interior of said side walls, for guiding a cleaning head mounted on said tool holder into contact with the surface of said capstan, said trackway means being in alignment with said capstan.

6. The kit set forth in claim 4 wherein two interchangeable cleaning heads are provided, each having a concave surface, one head having an abrasive surface and the other head having an absorbent surface.

7. The kit set forth in claim 1 further including aperture means in each of said side walls for receiving a peg to mount tension measuring means thereon.

8. The kit set forth in claim 6 further including a third interchangeable head comprising an absorbent swab.

9. The kit set forth in claim 8 wherein said tool holder comprises a bayonet-slot and each of said interchangeable heads includes projection means for lockingly engaging in said bayonet slot.

10. The kit set forth in claim 3 further including trackway means provided in the interior of said side walls, for guiding a cleaning head mounted on said tool holder into engagement with the surface of said capstan, the width of said cleaning head being approximately equal to the distance between said side walls and said trackway means being in alignment with said cut-out means.

* * * * *